United States Patent Office 2,879,164
Patented Mar. 24, 1959

2,879,164

FOODSTUFFS CONTAINING N⁶-ACYLLYSINES

Halbert C. White and Edgar C. Britton, Midland, Mich., assignors to The Dow Chemical Company, Midland, Mich., a corporation of Delaware No Drawing. Application January 17, 1957
Serial No. 634,611

4 Claims. (Cl. 99—14)

This invention relates to lysine-deficient foodstuffs containing an added heat stabilized lysine derivative. More particularly, it relates to cereal grain products, for example, bread, containing an $N^6$-acyllysine, whereby such products are rendered more adequate nutritionally.

Lysine is one of the amino acids essential for human nutrition. Many foods, for example, bread, are not nutritionally adequate in lysine. Also, in certain parts of the world, cereal grains and products derived therefrom make up a substantial proportion of the human diet, and because of their deficiency in lysine, such a diet is not nutritionally adequate.

Attempts have been made to fortify lysine-inadequate foodstuffs by adding lysine thereto. A difficulty in the lysine-fortification of such foodstuffs is that at elevated temperatures, such as in the baking of dough, or upon prolonged storage, a substantial proportion of the lysine is destroyed or made unavailable.

In accordance with this invention, it has now been discovered that $N^6$-acyllysines having acyl radicals containing up to four carbon atoms, by which are meant $N^6$-acyl-DL-lysines and $N^6$-acyl-L-lysines in which the acyl is formyl, acetyl, propionyl or butyryl, are more stable at elevated temperatures and can be added to lysine-inadequate foodstuffs to provide lysine in a form more stable at baking temperatures, for example, those used in baking bread. Between 0.1 and 1 percent, preferably between 0.2 and 0.5 percent of an $N^6$-acyllysine, based on the weight of foodstuff, is advantageously used. Larger amounts of an $N^6$-acyllysine compound can be used but are unnecessary from a nutritional standpoint and add to the food production cost.

In use, the $N^6$-acyllysine is added to the foodstuff at any convenient step in its processing or preparation. For example, with doughs it can be added prior to the first maturing (raising) or during the second maturing. With cereal grains (flours) it can be added directly to the flour. With cooked cereals, it can be added before, during, or after cooking. With aqueous beverages, it can be dissolved therein.

The following example represents a preferred embodiment of this invention.

EXAMPLE

A conventional white bread was baked from a dough prepared from shortening, milk solids, sugar, salt, yeast food, calcium propionate and white flour. The dough was fortified with $N^6$-acetyl-DL-lysine and compared with blanks fortified with L-lysine·HCl and DL-lysine·HCl. The following table shows results obtained by averaging three runs for breads corresponding to the doughs containing each of said added lysine compounds.

*Lysine content of bread samples, dry basis*

| Lysine Compound Added | Assayed Lysine, mg./g. | Added Lysine, mg./g. | Recovered Lysine, mg /g. | Percent Recovery of Added Lysine |
|---|---|---|---|---|
| L-lysine·HCl | 5.7 | 3.4 | 2.02 | 59 |
| N⁶-acetyl-DL-lysine | 6.1 | 3.4 | 2.4 | 70 |
| DL-lysine·HCl | 5.6 | 3.4 | 2.22 | 65 |

All assays were microbiological.

What is claimed is:

1. A heat-processed foodstuff normally deficient in lysine containing between 0.1 and 1 percent by weight of an added $N^6$-acyllysine wherein the acyl substituent contains from 1 to 4 carbon atoms and wherein the lysine moiety is selected from the group of L-lysine and DL-lysine, the $N^6$-acyllysine being added prior to the heat processing.

2. The product of claim 1, wherein the acyllysine is $N^6$-acetyl-DL-lysine.

3. A dough mixture for goods to be baked and normally deficient in lysine containing between 0.1 and 1 percent by weight of an added $N^6$-acyllysine wherein the acyl substituent contains from 1 to 4 carbon atoms and wherein the lysine moiety is selected from the group of L-lysine and DL-lysine.

4. The product of claim 3, wherein the acyllysine is $N^6$-acetyl-DL-lysine.

References Cited in the file of this patent

UNITED STATES PATENTS

| 2,344,229 | Block et al. | Mar. 14, 1944 |
| 2,386,926 | Block | Oct. 16, 1945 |

OTHER REFERENCES

"Biochemical Journal," 37 (1943), pages 515 to 518 relied on.

"Biochemical Journal," 38 (1944), pages 125, 128, 129 relied on.